US009842716B2

(12) United States Patent
Maloney et al.

(10) Patent No.: US 9,842,716 B2
(45) **Date of Patent: *Dec. 12, 2017**

(54) CIRCUIT INTERRUPTERS AND ELECTRICAL ENCLOSURES WITH REJECTION FEATURES

(71) Applicant: EATON CORPORATION, Cleveland, OH (US)

(72) Inventors: James Gerard Maloney, Industry, PA (US); Tony Ray Benson, White Heath, IL (US); Eric Alan Samuelson, Springfield, IL (US)

(73) Assignee: EATON CORPORATION, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/287,095

(22) Filed: Oct. 6, 2016

(65) Prior Publication Data

US 2017/0025239 A1 Jan. 26, 2017

Related U.S. Application Data

(63) Continuation of application No. 13/963,359, filed on Aug. 9, 2013, now Pat. No. 9,496,690.

(51) Int. Cl.

| | |
|---|---|
| ***H02H 3/087*** | (2006.01) |
| ***H02H 3/08*** | (2006.01) |
| ***H02H 9/02*** | (2006.01) |
| ***H02H 3/10*** | (2006.01) |
| ***H01H 71/08*** | (2006.01) |

(52) U.S. Cl.

CPC ....... *H01H 71/08* (2013.01); *H01H 2300/042* (2013.01)

(58) Field of Classification Search

CPC ................................ H02H 3/08; H02H 3/087

USPC ........................................................ 361/93.1

See application file for complete search history.

(56) References Cited

U.S. PATENT DOCUMENTS

2006/0209483 A1* 9/2006 Hurwicz ............ G01R 31/3333 361/115

* cited by examiner

*Primary Examiner* — Dharti Patel

(74) *Attorney, Agent, or Firm* — Eckert Seamans; Brij Agarwal; Grant Coffield

(57) ABSTRACT

A set of circuit interrupters and electrical enclosures that are configured to permit an electrical enclosure having a current rating to have connected therewith a circuit interrupter having a current carrying rating no greater than the current rating. However, a current interrupter having a current carrying rating less than the current rating of the electrical enclosure potentially may be connected therewith. Such electrical interruption equipment employs threaded studs on bus bars that are of varying sizes and/or are separated by varying distances in order to resist an electrical enclosure having a current rating from being electrically connected with a circuit interrupter having a current carrying rating greater than the current rating. Alternatively or additionally, the circuit interrupter and/or the electrical enclosure may have interference elements that physically interfere with the mounting and/or the electrical connection of a circuit interrupter having a current carrying rating with an electrical enclosure having a current rating less than the current carrying rating.

18 Claims, 9 Drawing Sheets

CIRCUIT INTERRUPTERS AND ELECTRICAL ENCLOSURES WITH REJECTION FEATURES

CROSS REFERENCE TO RELATED APPLICATION

The instant application claims priority from U.S. patent application Ser. No. 13/963,359 filed Aug. 9, 2013, the disclosures of which are incorporated herein by reference.

BACKGROUND

Field

The disclosed and claimed concept relates generally to electrical interruption equipment, and more particularly, to circuit interrupters and electrical enclosures which resist installation of a main circuit interrupter having a given current carrying rating from being installed in an electrical enclosure having a current rating less than the given current carrying rating.

Related Art

Electrical interruption equipment is well known for use in any of a variety of electrical applications in order to protect circuits or portions of circuits from certain predefined conditions. The predefined conditions can include overcurrent conditions, undervoltage conditions, fault conditions, and other conditions. Such electrical interruption equipment can include circuit interrupters such as circuit breakers, vacuum interrupters, and the like, and can further include electrical enclosures such as breaker panels, load centers, switchgear enclosures, and the like within which the circuit interrupters can be installed.

In certain applications such as domestic applications and other applications, the electrical interruption equipment may include an electrical enclosure that receives a main current feed and that distributes current to various other smaller circuits. Each such smaller circuit typically is protected by its own circuit interrupter having an appropriate current carrying rating. Such circuit interrupters are often installed in slots on the electrical enclosure and connect with one or more electrical bus bars within the electrical enclosure to provide current to the individual circuits. Such circuit interrupters are typically intended to individually trip in certain predefined circumstances in order to protect the corresponding circuit from any of the aforementioned predefined conditions.

The electrical interruption equipment in such an application typically additionally includes a main circuit interrupter that is interposed between the main current feed and the bus bars and is intended to trip and thus interrupt the flow of current to the bus bars if the overall current draw of all of the circuits combined exceeds a given current level and/or in other circumstances. Such a main circuit interrupter typically is selected to have a current carrying rating no greater than the current rating of the electrical enclosure. That is, the current flowing through the bus bars to the individual circuits results in $I^2R$ heating of the bus bars and other components, and an electrical enclosure thus has a current rating which should not be exceeded. This is in order to avoid possible damage to the electrical interruption equipment and possible injury and/or property destruction. The main circuit interrupter is thus typically selected to have a current carrying rating no greater than the current rating of the electrical enclosure, meaning that the main circuit interrupter will interrupt the current flow to the bus bars if the aggregate current flowing through the individual circuits that are connected with the bus bars reaches the current rating of the electrical enclosure. By way of example, a given electrical enclosure may have a current rating of 200 Amps, and it may have connected therewith various circuits that are protected by circuit interrupters mounted on the electrical enclosure and that may have current carrying ratings such as 15 Amps, 20 Amps, 30 Amps, 50 Amps, and the like depending upon the characteristics of the circuit. The aggregate current capacity of all of the various circuits combined (i.e., by adding together all of the various current carrying ratings of all of the circuit interrupters connected with the individual circuits) often exceeds the current rating of the panel because it is expected that fewer than all of the protected circuits will be simultaneously carrying their maximum current, such as in the way an electrical resistance furnace and an air conditioner would typically never be simultaneously operated even though they may be connected via separate individual circuits interrupters with the same load center.

While such electrical interruption equipment has been generally effective for its intended purposes, it has not been without limitation. Many of the circuit interrupters, including the main circuit interrupters and the individual circuit interrupters that are connected therewith, look very similar to one another. Even though the current carrying rating of a given circuit interrupter is typically clearly printed on the circuit interrupter itself, a possibility exists that a circuit interrupter, such as a main circuit interrupter having a current carrying rating that is less than or greater than what was intended to be used, can be connected with a given circuit such as between the main current feed and the bus bars of the electrical enclosure. An erroneous installation of a circuit interrupter having a current carrying rating less than what had been intended does not typically result in a meaningful concern of equipment damage or injury, apart from the fact that it may trip more often than is appropriate. Such frequent tripping might occur because the loads connected with the circuit interrupter may have been designed to draw relatively higher current and to be protected with a circuit interrupter having a greater current carrying rating than the erroneously installed circuit interrupter. However, the erroneous installation of a circuit interrupter having a current carrying rating greater than the protected circuit or the electrical enclosure itself can be problematic because the erroneously installed circuit interrupter does not trip when the current flowing through the connected circuit exceeds that for which it was originally designed. Such a situation can undesirably result in a potential for equipment damage, property destruction, and personal injury. It thus would be desirable to provide electrical interruption equipment that avoids such a possibility.

SUMMARY OF THE INVENTION

These and other needs are met by an improved set of circuit interrupters and electrical enclosures that are configured to permit an electrical enclosure having a current rating to have connected therewith a circuit interrupter having a current carrying rating no greater than the current rating. However, a current interrupter having a current carrying rating less than the current rating of the electrical enclosure potentially may be connected therewith. Such electrical interruption equipment employs threaded studs on bus bars that are of varying sizes and/or are separated by varying distances in order to resist an electrical enclosure having a current rating from being electrically connected with a circuit interrupter having a current carrying rating greater than the current rating. Alternatively or additionally, the circuit interrupter and/or the electrical enclosure may have interference elements that physically interfere with the mounting and/or the electrical connection of a circuit interrupter having a current carrying rating with an electrical enclosure having a current rating less than the current carrying rating.

Accordingly, an aspect of the disclosed and claimed concept is to provide one or more circuit interrupters and/or to provide one or more electrical enclosures whereby a given circuit interrupter can be electrically connected with an electrical enclosure only if the current carrying rating of the circuit interrupter is no greater than the current rating of the electrical enclosure.

Another aspect of the disclosed and claimed concept is to provide one or more circuit interrupters and/or one or more electrical enclosures wherein a circuit interrupter having a current carrying capability greater than the current rating of an electrical enclosure will be resisted from being electrically connected with such electrical enclosure.

These and other aspects of the disclosed and claimed concept are provided by an improved circuit interrupter having a current carrying rating, the circuit interrupter being structured to be installable in electrical connection with an electrical enclosure having a current rating at least equal to the current carrying rating and being structured to be non-installable in electrical connection with an electrical enclosure having a current rating less than the current carrying rating, the circuit interrupter can be generally stated as including an electrical interruption apparatus having a current carrying rating and comprising a housing and one or more of: a receptacle having a dimension, the dimension being structured to enable the receptacle to receive therein an elongated conductor of electrical enclosure having a current rating at least equal to the current carrying rating, the dimension being structured to resist at least one of: reception into the receptacle of a conductor of an electrical enclosure having a current rating less than the current carrying rating, and attachment of the circuit interrupter to a conductor of an electrical enclosure having a current rating less than the current carrying rating, a pair of receptacles that are spaced apart a distance, the distance being structured to enable the pair of receptacles to receive therein an elongated pair of conductors of an electrical enclosure having a current rating at least equal to the current carrying rating, the distance being structured to resist reception into the pair of receptacles of a pair of conductors of an electrical enclosure having a current rating less than the current carrying rating, and an exterior portion which is structured to be interfered with by an interference element of an electrical enclosure having a current rating less than the current carrying rating and which is thereby structured to resist electrical connection between the circuit interrupter and the electrical enclosure having the current rating less than the current carrying rating, the exterior portion being structured to be non-interfered with and to permit electrical connection of the circuit interrupter with an electrical enclosure having a current rating no less than the current carrying rating.

Other aspects of the disclosed and claimed concept are provided by an improved electrical enclosure having a current rating, the electrical enclosure being structured to receive in electrical connection therewith a circuit interrupter having a current carrying rating no greater than the current rating and being structured to resist electrical connection therewith of a circuit interrupter having a current carrying rating greater than the current rating, the electrical enclosure can be generally stated as including an electrical delivery apparatus having a current rating and comprising one or more of: an elongated conductor having a dimension, the dimension being structured to enable the conductor to be received in a receptacle of and to permit electrical connection with a circuit interrupter having a current carrying rating no greater than the current rating, the dimension being structured to resist at least one of: reception of the conductor in a receptacle of a circuit interrupter having a current carrying rating greater than the current rating, and attachment of the conductor into electrical connection with a circuit interrupter having a current carrying rating greater than the current rating, an elongated pair of conductors that are spaced apart a distance, the distance being structured to enable the pair of conductors to be receivable in a pair of receptacles of a circuit interrupter having a current carrying rating equal to or less than the current rating, the distance being structured to resist reception of the pair of conductors in a pair of receptacles of a circuit interrupter having a current carrying rating greater than the current rating, and an interference element that is structured to be engageable with and to thereby resist a circuit interrupter having a current carrying rating greater than the current rating from being electrically connected with the electrical enclosure, the interference element being structured to permit a circuit interrupter having a current carrying rating no greater than the current rating to be received in electrical connection with the electrical enclosure.

BRIEF DESCRIPTION OF THE DRAWINGS

A further understanding of the disclosed and claimed concept can be gained from the following Description when read in conjunction with the accompanying drawings in which:

Similar numerals refer to similar parts throughout the specification.

DESCRIPTION

Figure 1:
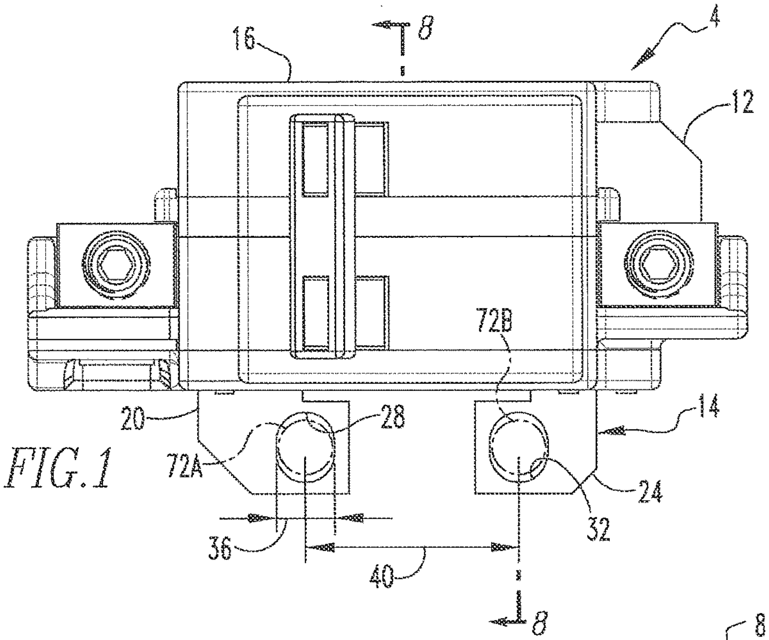
FIG. 1 is a front elevational view of a first circuit interrupter in accordance with the disclosed and claimed concept.

A first circuit interrupter 4 in accordance with the disclosed and claimed concept is depicted generally in FIG. 1. The first circuit interrupter 4 of FIG. 1 is electrically connectable with a first electrical enclosure 8 in accordance with the disclosed and claimed concept that is depicted generally in FIG. 2. The first circuit interrupter 4 has a first current carrying rating, and the first electrical enclosure 8 has a first current rating, with the first current carrying rating being no greater than the first current rating.

As can be seen in FIG. 1, the first circuit interrupter 4 includes a housing 12 upon which is disposed an electrical interruption apparatus 14 which includes components that are not expressly depicted herein such as one or more sets of separable contacts, one or more trip mechanisms, one or more bimetal sensors, one or more magnetic trip elements, one or more current transformers, and the like without limitation. The housing can be said to include an exterior situated externally to the housing 12.

Figure 7:
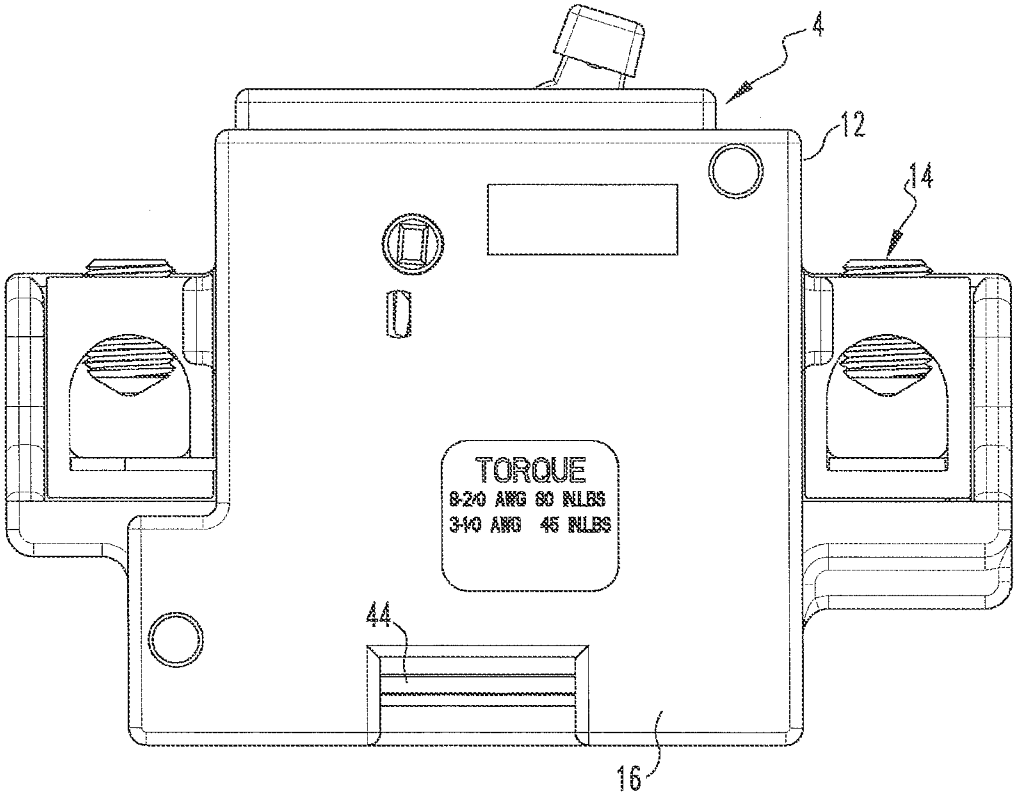
FIG. 7 is a top plan view of the first circuit interrupter of FIG. 1.

The electrical interruption apparatus 14 includes a pair of electrical terminals 20 and 24 which have a pair of holes 28 and 32, respectively, formed therein. The holes 28 and 32 serve as receptacles that enable electrical connections with the electrical terminals 20 and 24. It can be seen from FIG. 1 that the holes 28 and 32 are slightly elongated holes and each have a diameter 36. The diameter 36 is indicated in the context of the hole 28 but is the same for the hole 32, with the holes 28 and 32 each having the same diameter 36 across the smallest transverse dimension thereof. The holes 28 and 32 also are separated from one another by a first distance 40 which is indicated in FIG. 1 as being represented by a center-to-center spacing between the holes 28 and 32. The housing 12 additionally has a notch 44 (FIGS. 7 and 8) formed therein at a portion of the exterior 16, and it can be seen that the notch 44 is a void region from which the material that otherwise forms the housing 12 is absent.

Figure 2:
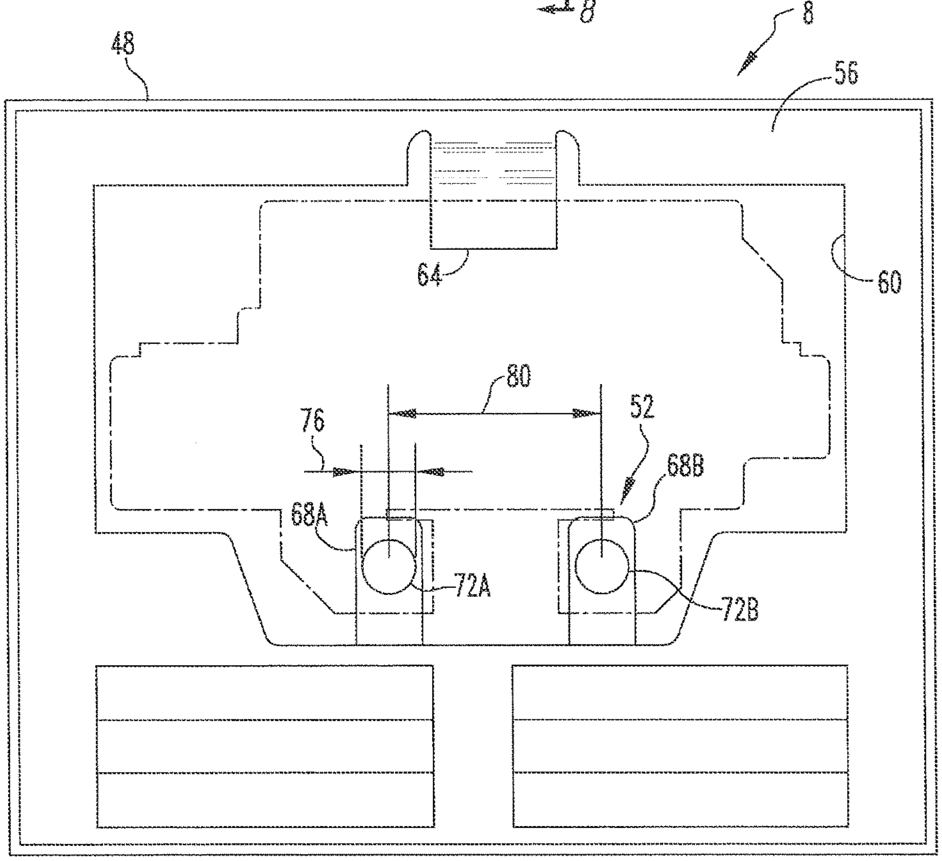
FIG. 2 is a front elevational view of a first electrical enclosure, partially cut away, with which the circuit interrupter of FIG. 1 can be electrically connected.

The first electrical enclosure 8 can be seen in FIG. 2 to have a housing 48 upon which is situated an electrical delivery apparatus 52. The housing 48 can be said to be an enclosure apparatus and is depicted in a schematic fashion and without its typical cover for purposes of simplicity of disclosure. The same can be said of the other electrical enclosures that are described elsewhere herein.

Figure 8:
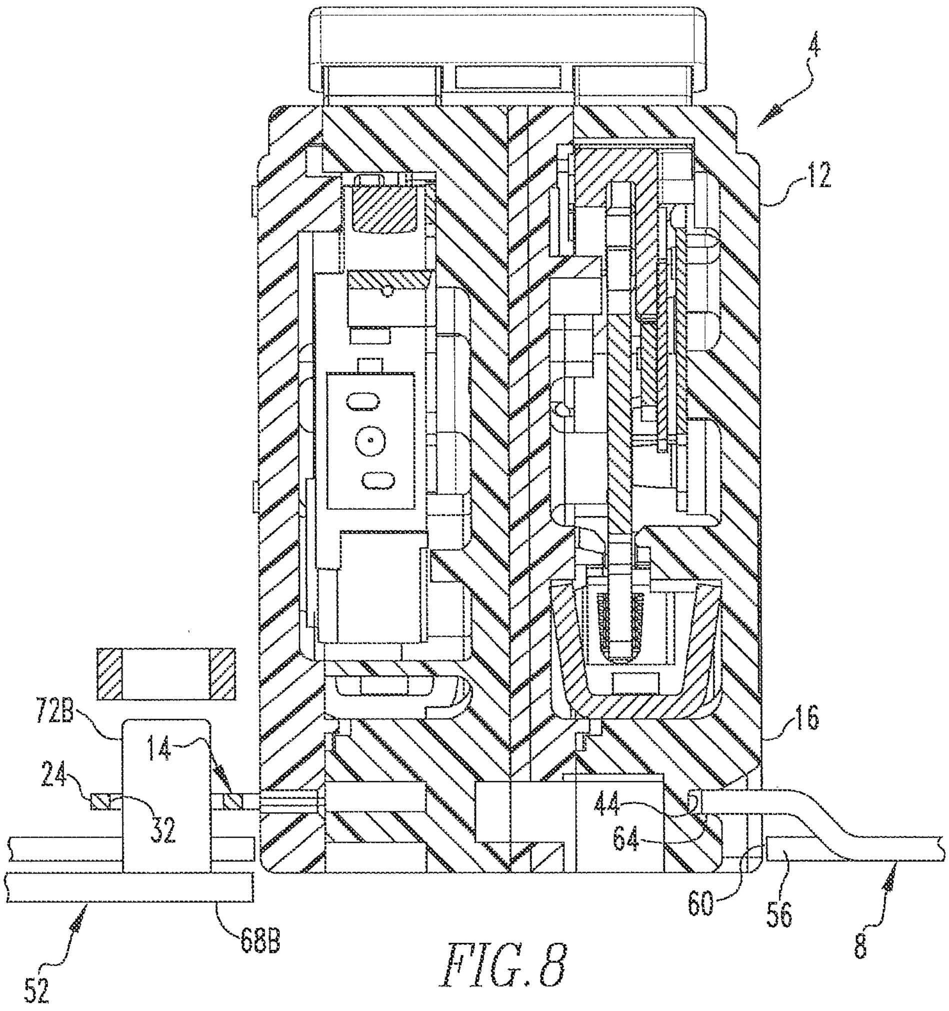
FIG. 8 is a sectional view as taken along line 8-8 of the first circuit interrupter of FIG. 1 as it would be installed on the first electrical enclosure of FIG. 2.

The housing 48 includes a plate 56 or other structure that is mounted internally thereto and which has an opening 60 formed therein. The plate 56 has formed therein an interference element 64 which is depicted in FIGS. 2 and 8 as being a hook-like protuberant structure or lug that is curved and is upstanding from the other portions of the plate 56.

The electrical delivery apparatus 52 is schematically depicted in FIG. 2 as including a pair of bus bars 68A and 68B to which are mounted a pair of studs 72A and 72B that are elongated and that protrude out of the plane of the page of FIG. 2. The studs 72A and 72B are each of a diameter 76 which is indicated in FIG. 2 only in the context of the stud 72A for purposes of simplicity of disclosure. That is, the studs 72A and 72B are both of the same diameter 76, with the diameter 76 being a transverse dimension of the studs 72A and 72B that is measured transverse to their longitudinal extent (which, as set forth above, is out of the plane of the page of FIG. 2). The studs 72A and 72B are separated apart by a distance that is represented by a spacing 80 between the studs 72A and 72B.

The diameter 76 of the studs 72A and 72B is equal to or slightly less than the diameter 36 of the holes 28 and 32. Moreover, the distance between the studs 72A and 72B represented by the spacing 80 is equal to the first distance 40 between the holes 32 and 36. As such, the studs 72A and 72B are receivable in the holes 28 and 32, respectively. Moreover, and as can be seen in FIG. 8, the interference element 64 is receivable in the notch 44 when the studs 72A and 72B are received in the holes 28 and 32, respectively.

The first circuit interrupter 4 is thus mountable on the first electrical enclosure 8 and is electrically connectable therewith. That is, the studs 72A and 72B, the interference element 64, and the holes 28 and 32 are sized and positioned with respect to one another to permit the interference element 64 to be received in the notch 44 and to thus at least potentially be mechanically engaged with the housing 12 when the studs 72A and 72B are received in the holes 28 and 32, respectively. In this regard, it can be seen in FIG. 1 that the studs 72A and 72B are depicted in dashed lines as being receivable in the holes 28 and 32, respectively. It can also be seen that the housing 12 in the depicted exemplary embodiment is at least partially received in the opening 60.

Since the first current carrying rating of the first circuit interrupter 4 is no greater than the current rating of the first electrical enclosure 8, the first circuit interrupter 4 is thus electrically connectable with the first electrical enclosure 8, meaning that the first circuit interrupter 4 can be physically accommodated in or on the first electrical enclosure 8 and the electrical delivery apparatus 52 of the first electrical enclosure 8 can be electrically connected with the electrical interruption apparatus 14 of the first circuit interrupter 4. In this regard, the interference element 64 does not interfere with the installation of the first circuit interrupter 4 in mechanical and electrical connection with the first electrical enclosure 8 since the notch 44 provides a void region into which the free end of the interference element 64 is receivable, whereby the notch 44 and the interference element 64 can be said to be non-interfering with one another and to thus rather permit the installation of the first circuit interrupter 4 on the first electrical enclosure 8.

Figure 3:
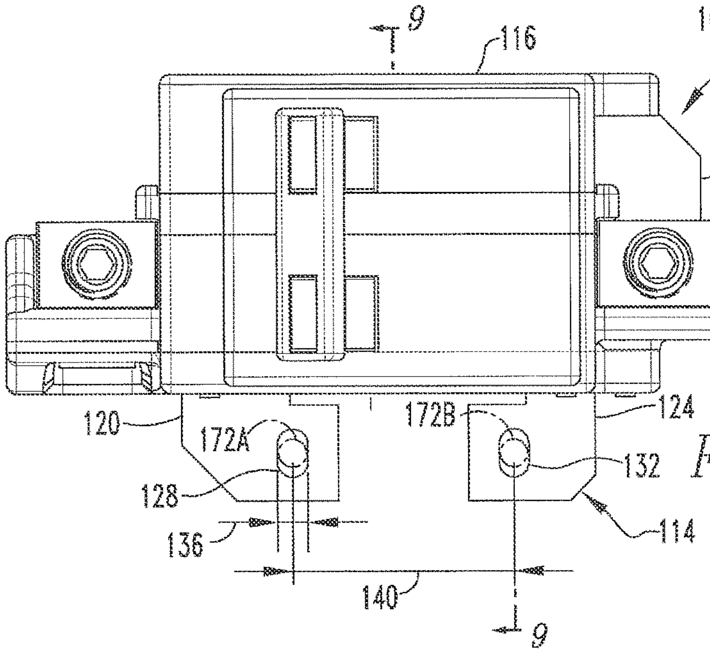
FIG. 3 is a front elevational view of a second circuit interrupter in accordance with the disclosed and claimed concept.

A second circuit interrupter in accordance with the disclosed and claimed concept is depicted generally in FIG. 3 and can be said to have a second current carrying rating. The second circuit interrupter 104 is mountable to and electrically connectable with a second electrical enclosure 108 in accordance with the disclosed and claimed concept that is depicted generally in FIG. 4. The second electrical enclosure 108 has a second current rating. The second current carrying rating of the second circuit interrupter 104 is greater than the first current carrying rating of the first circuit interrupter 4. Likewise, the second current rating of the second electrical enclosure 108 is greater than the first current rating of the first electrical enclosure 8. It is noted, however, that the second current carrying rating of the second circuit interrupter 104 is no greater than the second current rating of the second electrical enclosure 108, thereby permitting the second interrupter 104 to be mounted and electrically connected with the second electrical enclosure 108.

The second circuit interrupter 104 is physically very similar to the first circuit interrupter 4 except that it includes a pair of the holes 128 and 132 formed in a pair of electrical terminals 120 and 124, respectively, that are each of a diameter 136 that is relatively smaller than the diameter 36 of the holes 28 and 32 of the first circuit interrupter 4. Another difference between the two, as suggested above, is that the second circuit interrupter 104 has a greater current carrying rating than that of the first circuit interrupter 4.

In a fashion similar to the first circuit interrupter 4, the second circuit interrupter 104 includes an electrical interruption apparatus 114 disposed on a housing 112 having an exterior 116, a portion of which has a notch 144 formed therein. While the diameter 136 of the holes 128 and 132 is less than the diameter 36 of the holes 28 and 32, a second distance 140 between the holes 128 and 132, depicted herein as being a center-to-center distance, is equal to the first distance 40 between the holes 28 and 32.

Figure 4:
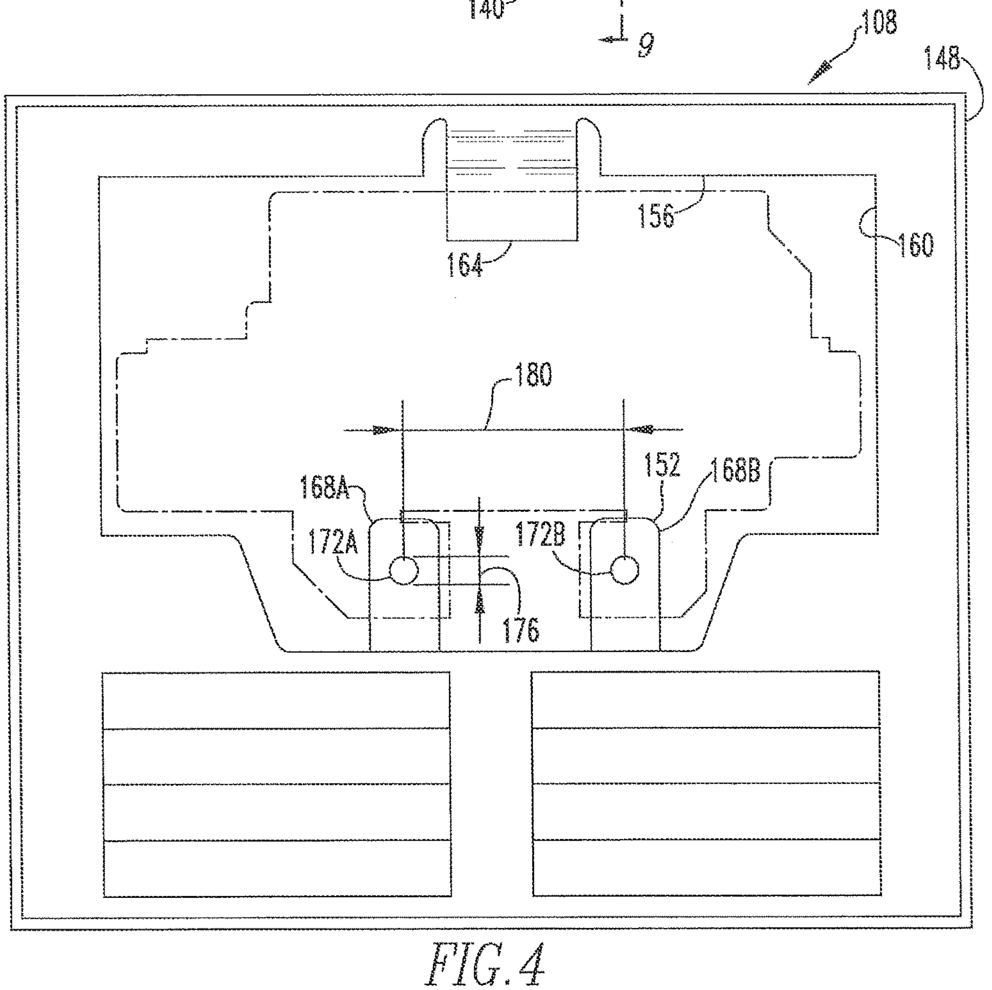
FIG. 4 is a front elevational view of a second electrical enclosure, partially cut away, with which the circuit interrupter of FIG. 3 can be electrically connected.

The second electrical enclosure 108 is depicted in FIG. 4 as likewise being physically similar to the first electrical enclosure 8 except having a pair of studs 172A and 172B that are each of a diameter 176 that is smaller than the diameter 76 of the studs 72A and 72B. The studs 172A and 172B are separated apart by a distance that is represented by a spacing 180 in FIG. 4, and the depicted exemplary spacing 180 is equal to each of the second distance 140, the first distance 40, and the spacing 80. The second electrical enclosure 108 has a housing 148 upon which is disposed an electrical delivery apparatus 152, and the electrical delivery apparatus 152 includes a pair of bus bars 168A and 168B upon which the elongated studs 172A and 172B, respectively, are mounted. The housing 148 additionally has a plate 156, an opening 160, and an interference element 164 that are substantially the same as the plate 56, the opening 60, and the interference element 64 of the first electrical enclosure 8.

Figure 9:
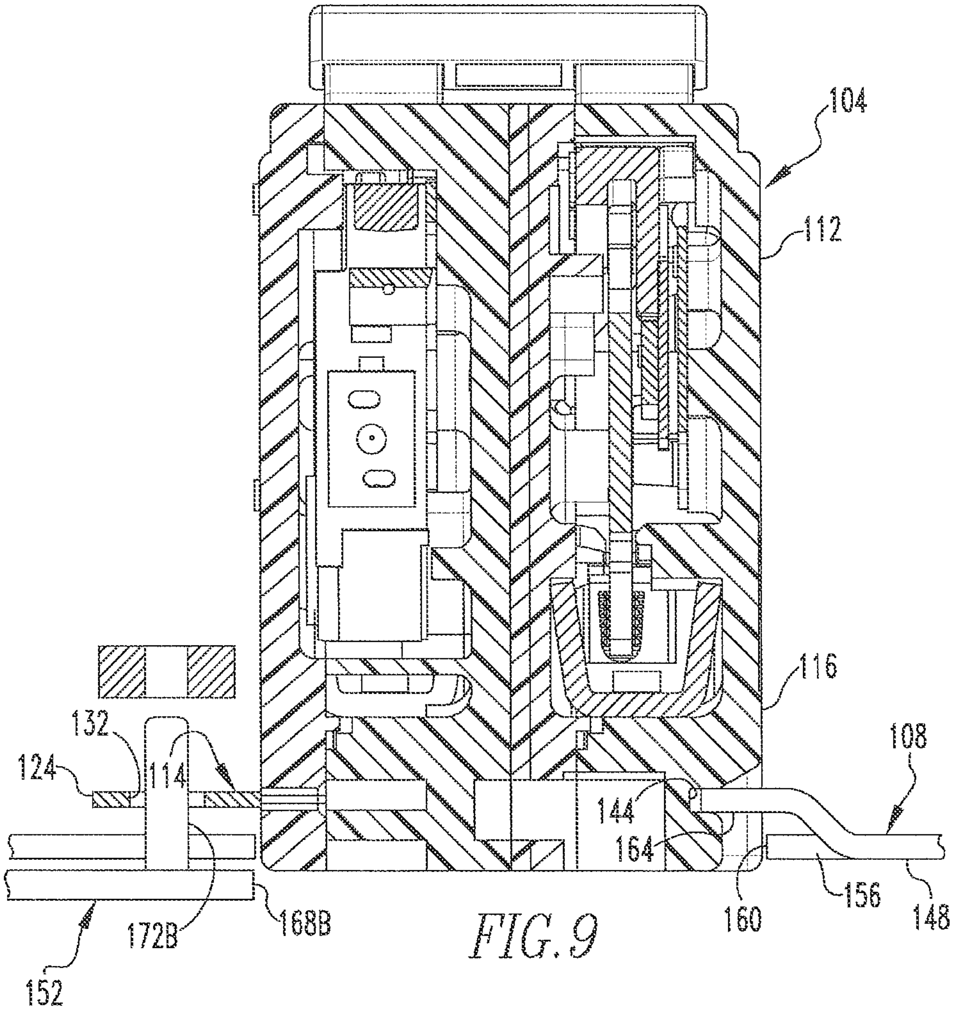
FIG. 9 is a sectional view as taken along line 9-9 of the second circuit interrupter of FIG. 3 as it would be installed on the second electrical enclosure of FIG. 4.

It can be understood from FIGS. 3 and 4 that the diameter 176 of the studs 172A and 172B is less than or equal to the diameter 136 of the holes 128 and 132, and the spacing 180 between the studs 172A and 172B is equal to the second distance 140 between the holes 128 and 132. As such, the studs 172A and 172B are receivable in the holes 128 and 132, respectively. Moreover, and as can be seen in FIG. 9, the interference element 164 is receivable in a notch 144 formed in the housing 112 at the exterior 116, which enables the second circuit interrupter 104 to be physically accommodated by the second electrical enclosure 108, which includes being receivable in the opening 160.

It is noted that since the spacing 180 between the studs 172A and 172B of the second electrical enclosure 108 is equal to the first distance 40 between the holes 28 and 32 of the first circuit interrupter 4, and because the diameter 176 of the studs 172A and 172B is relatively smaller than the diameter 36 of the holes 28 and 32, the first circuit interrupter 4 is mountable to and electrically connectable with the second electrical enclosure 108 whereby the interference element 164 would be receivable in the notch 44. This is advantageous because the current carrying rating of the first circuit interrupter 4 is less than the second current rating of the second electrical enclosure 108. That is, the first and second circuit interrupters 4 and 104 are each (alternatively) electrically connectable with the second electrical enclosure 108 since the first current carrying rating and the second current carrying rating of the first and second circuit interrupters 4 and 104, respectively, are each no greater than the current rating of the second electrical enclosure 108.

It is further noted, however, that despite the second distance 140 of the holes 128 and 132 being equal to the spacing 80 of the studs 72A and 72B, the second circuit interrupter 104 is not mountable to the first electrical enclosure 108 and rather is rejected from such installation since the diameter 76 of the studs 72A and 72B is larger than the diameter 136 of the holes 128 and 132. This is likewise desirable because the second current carrying rating of the second circuit interrupter 104 is greater than the first current rating of the first electrical enclosure 108. As such, while the first and second distances 40 and 140 and the spacing 180 are equal and thus permit either of the first and second circuit interrupters 4 and 104 to be installed in the second electrical enclosure 108, the diameter 76 of the studs 72A and 72B being greater than the diameter 136 of the holes 128 and 132 resists and rejects the second interrupter 104 from being installed on the first electrical enclosure 8. Again, while it is acceptable for the second electrical enclosure 108 to have installed therein a main circuit interrupter having a current carrying rating no greater than the second current rating, such as the first and second circuit interrupters 4 and 104, the first electrical enclosure 8 advantageously rejects the installation of a main circuit interrupter such as the second circuit interrupter 104 having a current carrying rating greater than the first current rating.

Figure 5:
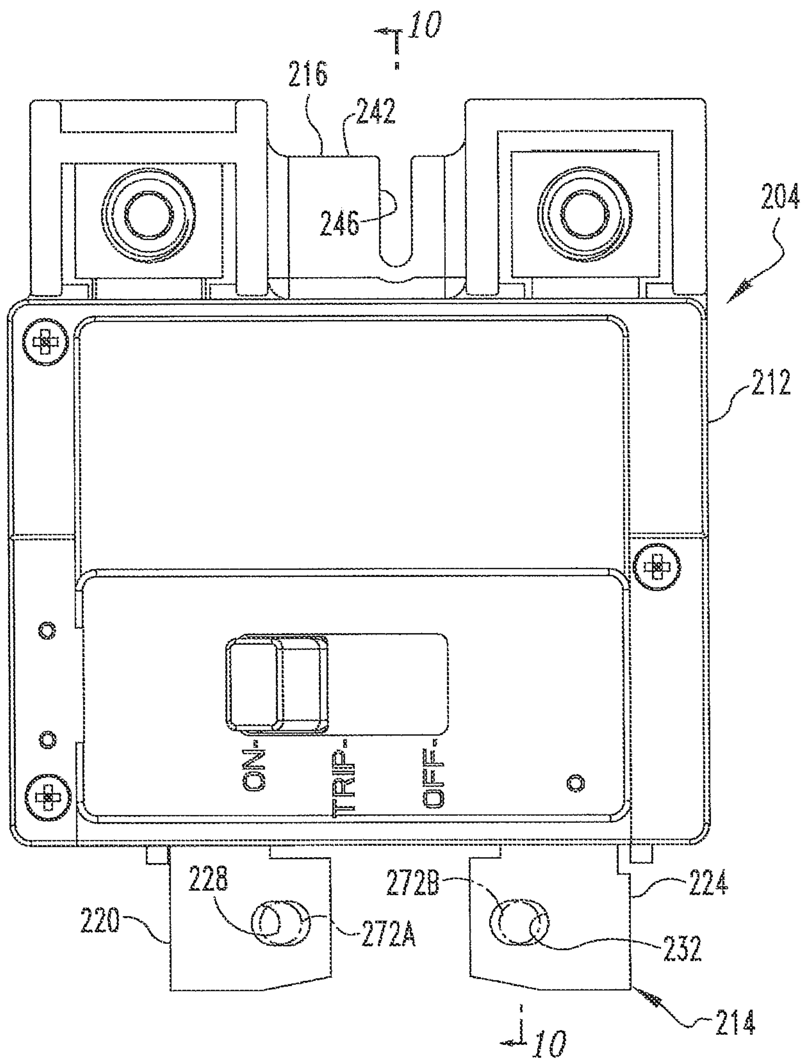
FIG. 5 is a front elevational view of a third circuit interrupter in accordance with the disclosed and claimed concept.
Figure 6:
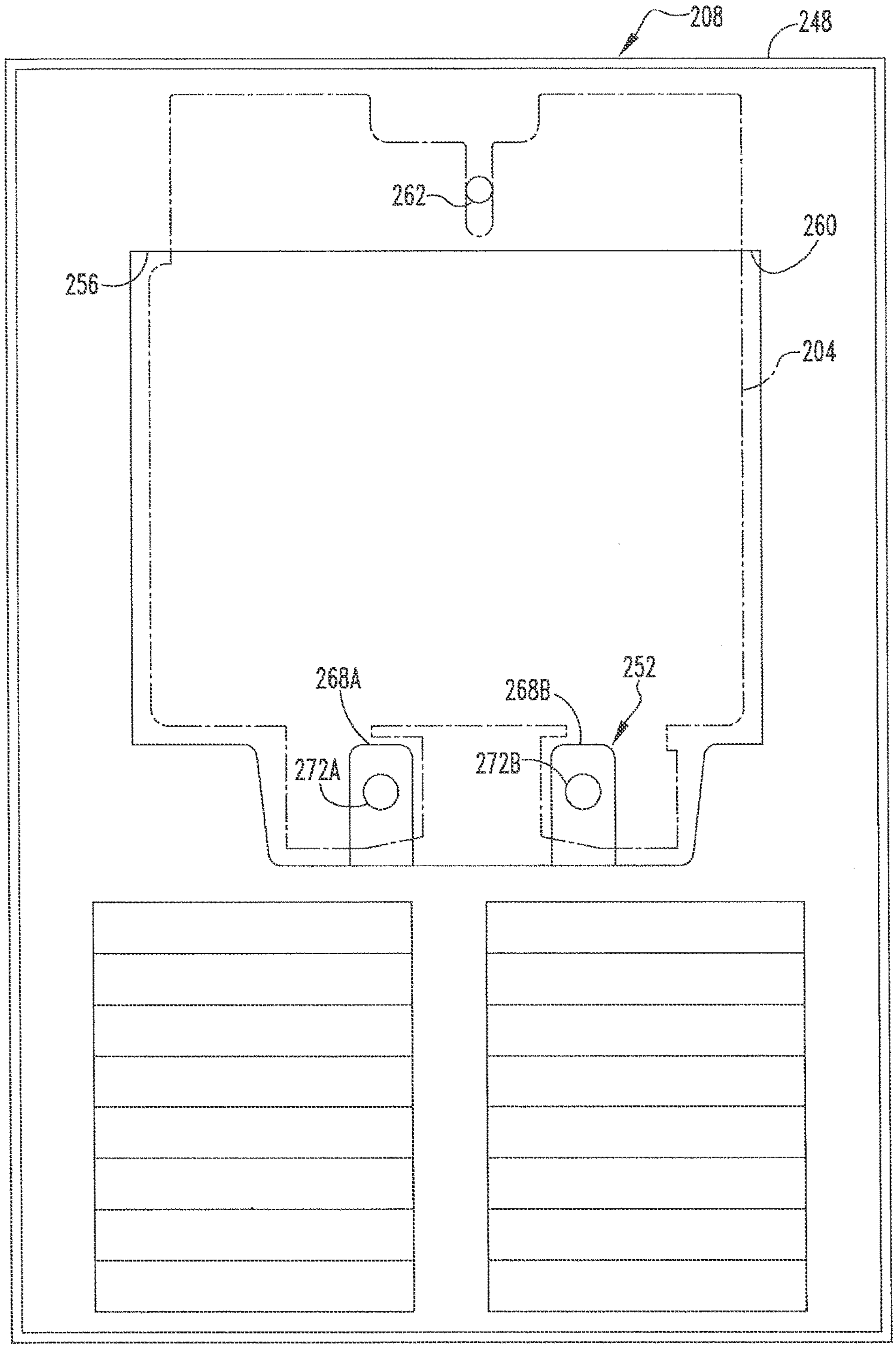
FIG. 6 is a front elevational view of a third electrical enclosure, partially cut away, with which the circuit interrupter of FIG. 5 can be electrically connected.

A third circuit interrupter 204 in accordance with the disclosed and claimed concept is depicted generally in FIG. 5 and is installable in a third electrical enclosure 208 in accordance with the disclosed and claimed concept that is depicted generally in FIG. 6. The third circuit interrupter 204 has a third current carrying rating which, in the depicted exemplary embodiment, is equal to a third current rating of the third electrical enclosure 208. The third current carrying rating of the third circuit interrupter 204 is greater than both the first and second current carrying ratings of the first and second current interrupters 4 and 104. Likewise, the third current rating of the third electrical enclosure 208 is greater than either of the first and second current ratings of the first and second electrical enclosures 8 and 108.

The third circuit interrupter 204 includes a housing 212 upon which is disposed an electrical interruption apparatus 214. The housing 212 has an exterior that is larger than either of the housings 12 and 112, and that is likewise larger than either of the openings 60 and 160 in the first and second electrical enclosures 8 and 108. Also, the interference elements 64 and 164 would interfere with the reception thereon of a web 242 of the housing 212 and other portions of the housing 212. These features thus advantageously reject the third circuit interrupter 204 from being installed on either the first and second electrical enclosures 8 and 108.

As can be seen in FIG. 5, the second circuit interrupter 204 has a pair of electrical terminals 220 and 224 having a pair of holes 228 and 232, respectively, formed therein. A pair of studs 272A and 272B of the third electrical enclosure 208 are spaced and are sized to be accommodated in the holes 228 and 232. The third electrical enclosure 208 includes a housing 248 having an electrical delivery apparatus 252 disposed thereon and further includes a plate 256 having an opening 260 formed therein and further having a threaded hole 262 formed therein. The third circuit interrupter 204 has a slot 246 formed in the web 242, and a threaded fastener 256 is receivable through the slot 246 and in the threaded hole 262 to permit the third circuit interrupter 204 to be physically fastened to the third electrical enclosure 208.

Figure 10:
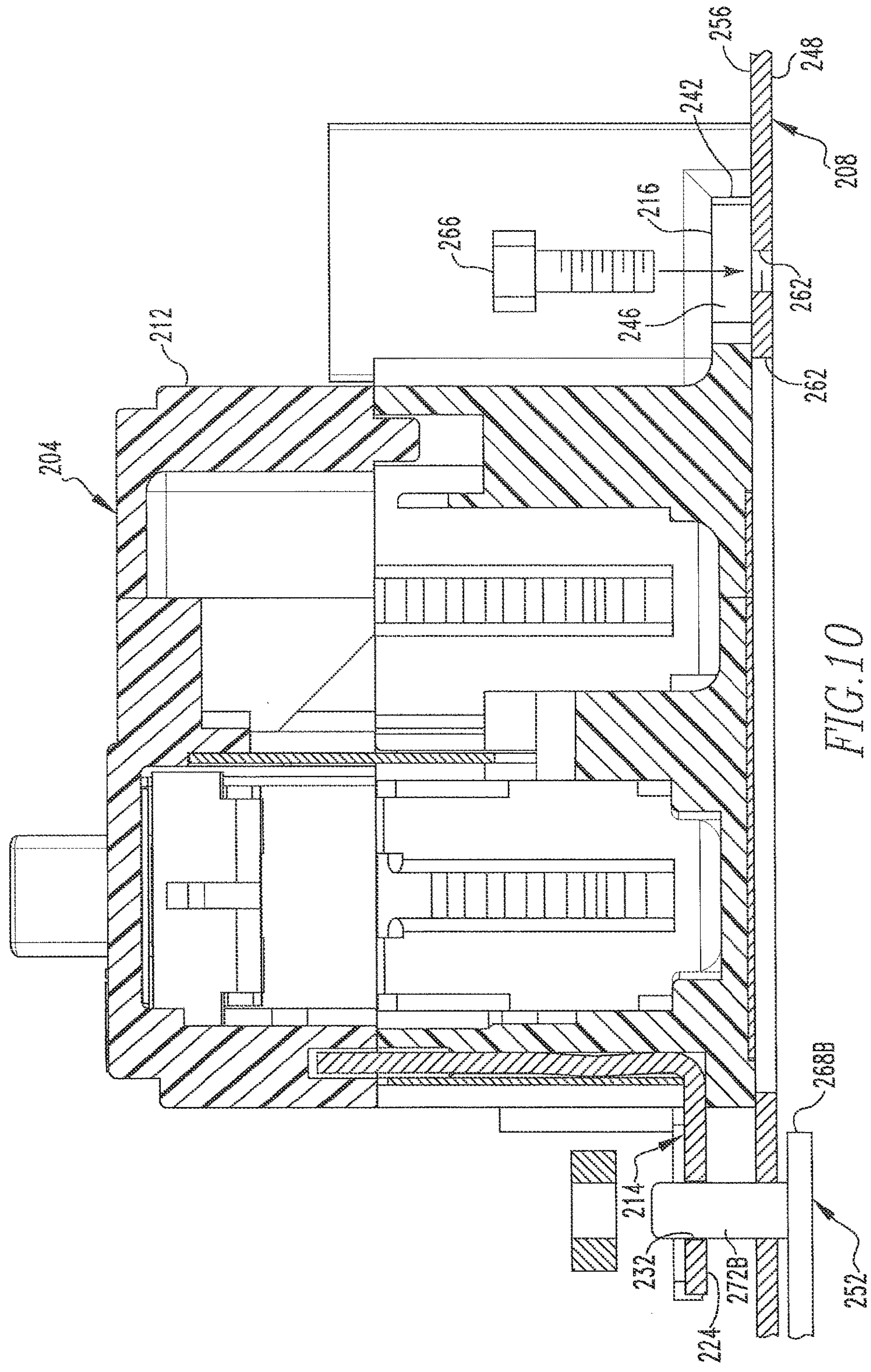
FIG. 10 is a sectional view as taken along line 10-10 of the third circuit interrupter of FIG. 5 as it would be installed on the third electrical enclosure of FIG. 6.

The electrical delivery apparatus 252 includes a pair of bus bars 268A and 268B to which the studs 272A and 272B, respectively, are mounted. As can be understood from FIGS. 8, 9, and 10, which are intended to be of the same scale, the housing 212 of the third circuit interrupter 204 is sufficiently large that it would be non-receivable in the openings 60 and 160 of the first and second electrical enclosures 8 and 108 and, as mentioned above, the interference elements 64 and 164 would interfere with the web 242 and other portions of the housing 212, and vice versa. As such, the third circuit interrupter 204 is resisted and rejected from being installed on either of the first and second electrical enclosures 8 and 108.

While the diameter and spacing of the studs 272A and 272B enables them to be physically received in the holes 228 and 232 and to be electrically connected with the electrical terminals 220 and 224, such diameter and spacing of the studs 272A and 272B may or may not be configured to enable the first and second circuit interrupters 4 and 104 to be mounted on the third electrical enclosure 208. That is, while the third circuit interrupter 204 is installable on the third electrical enclosure 208 but is resisted from being installed on the first and second electrical enclosures 8 and 108, the first and second circuit interrupters 4 and 104 may or may not be installable on the third electrical enclosure 208 depending upon the needs of the particular application. That is, the diameter and spacing of the studs 272A and 272B could be configured to enable them to be electrically connected with the first and second circuit interrupters 4 and 104, and the third electrical enclosure 208 potentially could include some type of physical structure that would be receivable in the notches 44 and 144 to enable installation of the first and second circuit interrupters 4 and 104 on the third electrical enclosure 208, although such variability is not necessarily needed. For instance, if it is desired to provide such variability, the studs 272A and 272B can be sized and spaced to be accommodated in the holes 28 and 32 and the holes 128 and 132. On the other hand, if such variability is unneeded or undesired, the diameter and spacing of the studs 272A and 272B need not necessarily be such as to enable connection of the first and second interrupters 4 and 104.

It thus can be seen from the foregoing that the third circuit interrupter 204 is installable in the third electrical enclosure 208 but is resisted from and rejected from being installed on the first and second electrical enclosures 8 and 108. And, depending upon the particular configuration of the third electrical enclosure 208, the first and second circuit interrupters 4 and 104 potentially could be mounted on the third electrical enclosure 208 and electrically connected therewith. This is because the third circuit interrupter 204 and the third electrical enclosure 208 are such that a circuit interrupter having a given current carrying rating is resisted from being installed on an electrical enclosure having a current rating less than the given current carrying rating.

Moreover, while the first current interrupter 4 is installable on either of the first and second electrical enclosures 8 and 108, the second current interrupter 104 is resisted and rejected from being installed on the first electrical enclosure 8 because the first and second circuit interrupters 4 and 104 and the first and second electrical enclosures 8 and 108 are configured such that a circuit interrupter having a given current carrying rating cannot be installed in an electrical enclosure having a current rating less than the given current carrying rating. While in some circumstances an electrical enclosure such as the first and second electrical enclosures 8 and 108 can have mounted therein a circuit interrupter such as the first and second circuit interrupters 4 and 104 so long as the current carrying rating is no greater than the current rating, an attempt to install a circuit interrupter having a particular current carrying rating into an electrical enclosure having a current rating less than the particular current carrying rating would be resisted and rejected. The circuit interrupters 4, 104, and 204, and the electrical enclosures 8, 108, and 208 together and individually thus advantageously resist an electrical enclosure having a current rating from having mounted thereto a circuit interrupter having a current carrying rating greater than the current rating, whereas a circuit interrupter having a current carrying rating equal to or less than the current rating of the electrical enclosure may or may not be permitted depending upon the needs of the particular application.

Figure 11:
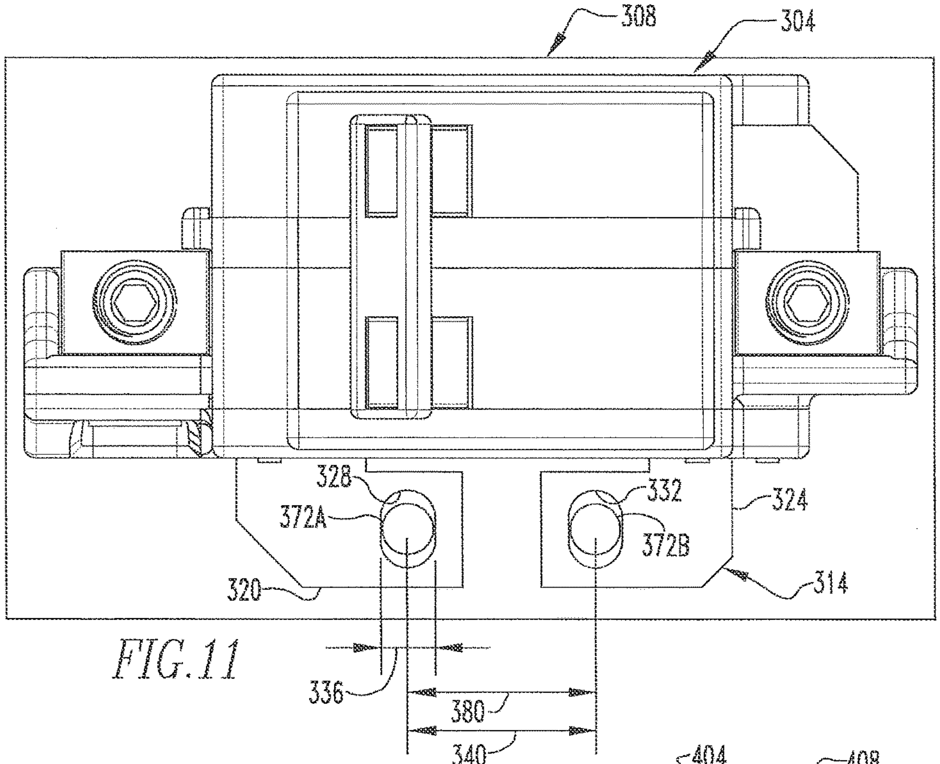
FIG. 11 is a front elevational view of a fourth circuit interrupter in accordance with the disclosed and claimed concept mounted on a schematically depicted fourth electrical enclosure in accordance with the disclosed and claimed concept.
Figure 12:
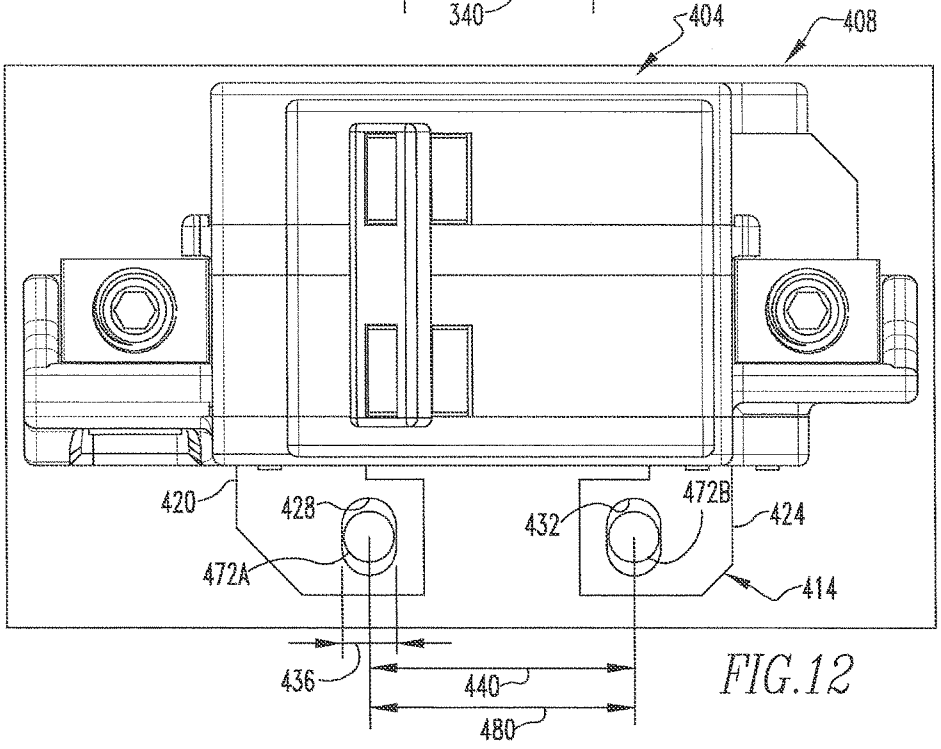
FIG. 12 is a front elevational view of a fifth circuit interrupter in accordance with the disclosed and claimed concept mounted on a schematically depicted fifth electrical enclosure in accordance with the disclosed and claimed concept.

A fourth circuit interrupter 304 and a fifth circuit interrupter 404 in accordance with the disclosed and claimed concept are depicted in FIGS. 11 and 12, respectively, as being installed in a schematically depicted fourth electrical enclosure 308 and a schematically depicted fifth electrical enclosure 408, respectively, that are likewise in accordance with the disclosed and claimed concept. The fourth circuit interrupter 304 has a fourth current carrying rating that is different from a fifth current carrying rating of the fifth circuit interrupter 404. The fourth electrical enclosure 308 has a fourth current rating that is greater than or equal to the fourth current carrying rating, and the fifth electrical enclosure 408 has a fifth current rating that is equal to or greater than the fifth current carrying rating.

The exemplary fourth and fifth circuit interrupters 304 and 404 are physically similar to one another. However, the fourth circuit interrupter 304 has an electrical interruption apparatus 314 that includes a pair of electrical terminals 320 and 324 having a pair of holes 328 and 332, respectively, formed therein that are of a diameter 336 and that are spaced apart by a distance 340. The fifth circuit interrupter 404 has an electrical interruption apparatus 414 that includes a pair of electrical terminals 420 and 424 having a pair of holes 428 and 432, respectively, formed therein that are of a diameter 436 and that are spaced apart by a distance 440. While the diameter 436 is equal to the diameter 336, the distance 440 is different from the distance 340. It thus can be understood that as an alternative to the different diameters 76 and 176 of the studs 72A and 72B and the studs 172A and 172B, the different distances 340 and 440 between the pair of studs 372A and 372B and the pair of studs 472A and 472B, respectively, can be likewise used to enable or reject installation of a circuit interrupter. Such enablement or rejection of installation of a circuit interrupter having a current carrying rating would depend upon whether the current rating of the electrical enclosure to which the circuit interrupter is intended to be installed is i) at least equal to or ii) less than the current carrying rating, respectively.

While the distance 340 between the holes 328 and 332 is equal to a spacing 380 between the pair of studs 372A and 372B, and the distance 440 between the holes 428 and 432 is equal to a spacing 480 between the pair of studs 472A and 472B, the distances 340 and 440 are different from one another, and the spacings 380 and 480 are likewise different from one another. It thus can be understood that the distance between the receptacles of the electrical terminals of a circuit interrupter and the distance between the studs of an electrical enclosure can additionally or alternatively control the installation or rejection of a given circuit interrupter on a given electrical enclosure in accordance with the relationships mentioned herein between the current carrying rating and the current rating thereof, respectively, or based upon other criteria which might desirably be employed in determining which circuit interrupters are mountable to which electrical enclosures.

While certain examples are presented herein wherein diameters of studs and holes and/or spacing between studs and holes and/or the use of interfering structures have been used, it is understood that any of the foregoing, individually or in combination, can be employed to effect the advantageous enabling or rejecting of the connection of circuit interrupters with electrical enclosures.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A circuit interrupter having a current carrying rating, the circuit interrupter being structured to be installable in electrical connection with an electrical enclosure having a current rating at least equal to the current carrying rating and being structured to be non-installable in electrical connection with an electrical enclosure having a current rating less than the current carrying rating, the circuit interrupter comprising:

an electrical interruption apparatus having a current carrying rating and comprising a housing and a number of rejection features; and at least a first rejection feature of the number of rejection features comprising a physical feature that is structured to permit the circuit interrupter to be electrically connected with and to be mounted on an electrical enclosure having a current rating at least equal to the current carrying rating while also being structured to resist the circuit interrupter from being at least one of electrically connected with and mounted on an electrical enclosure having a current rating less than the current carrying rating.

2. The circuit interrupter of claim 1 wherein the at least first rejection feature comprises one or more of:

a receptacle having a dimension, the dimension being structured to enable the receptacle to receive therein an elongated conductor of electrical enclosure having a current rating at least equal to the current carrying rating, the dimension being structured to resist at least one of:

reception into the receptacle of a conductor of an electrical enclosure having a current rating less than the current carrying rating, and attachment of the circuit interrupter to a conductor of an electrical enclosure having a current rating less than the current carrying rating;

a pair of receptacles that are spaced apart a distance, the distance being structured to enable the pair of receptacles to receive therein an elongated pair of conductors of an electrical enclosure having a current rating at least equal to the current carrying rating, the distance being structured to resist reception into the pair of receptacles of a pair of conductors of an electrical enclosure having a current rating less than the current carrying rating; and an exterior portion which is structured to be interfered with by an interference element of an electrical enclosure having a current rating less than the current carrying rating and which is thereby structured to resist electrical connection between the circuit interrupter and the electrical enclosure having the current rating less than the current carrying rating, the exterior portion being structured to be non-interfered with and to permit electrical connection of the circuit interrupter with an electrical enclosure having a current rating no less than the current carrying rating.

3. The circuit interrupter of claim 2 wherein the electrical interruption apparatus comprises an electrical terminal, wherein the receptacle comprises a hole formed in the electrical terminal, and wherein the dimension is one of:

a diameter of the hole that is structured to be smaller than the diameter of the conductor of the electrical enclosure having the current rating less than the current carrying rating; and a depth of the hole that is equal to or greater than the length of the conductor of the electrical enclosure having the current rating less than the current carrying rating that the hole is structured to receive therein.

4. The circuit interrupter of claim 2 wherein the electrical interruption apparatus comprises an electrical terminal, wherein the receptacle comprises a hole formed in the electrical terminal, and wherein the dimension is a transverse dimension of the hole and is of a size that is structured to be:

smaller than a transverse dimension of the elongated conductor of the electrical enclosure having the current rating less than the current carrying rating; and equal to or larger than a transverse dimension of the elongated conductor of the electrical enclosure having the current rating at least equal to the current carrying rating.

5. The circuit interrupter of claim 2 wherein the electrical interruption apparatus comprises a pair of electrical terminals, wherein the pair of receptacles comprise a pair of holes formed in the pair of electrical terminals, and wherein the distance is a spacing between the pair of holes and is of a size that is structured to:

correspond with a spacing between the pair of conductors of the electrical enclosure having the current rating at least equal to the current carrying rating; and conflict with a spacing between the pair of conductors of the electrical enclosure having the current rating less than the current carrying rating.

6. The circuit interrupter of claim 5 wherein the spacing is of a size that is structured to be:

equal to the spacing between the pair of conductors of the electrical enclosure having the current rating at least equal to the current carrying rating; and different than the spacing between the pair of conductors of the electrical enclosure having the current rating less than the current carrying rating.

7. The circuit interrupter of claim 2 wherein the housing is formed of a housing material, and wherein the exterior portion is a region at the exterior of the housing that is devoid of the housing material.

8. The circuit interrupter of claim 7 wherein the region at the exterior of the housing is an indentation that is foliated in the housing and that is structured to receive and to be engaged with the at least portion of the interference element.

9. The circuit interrupter of claim 1 wherein the physical feature is a physical dimension that is structured to permit the circuit interrupter to be electrically connected with and to be mounted on the electrical enclosure having the current rating at least equal to the current carrying rating while also being structured to resist the circuit interrupter from being at least one of electrically connected with and mounted on the electrical enclosure having the current rating less than the current carrying rating.

10. An electrical enclosure having a current rating, the electrical enclosure being structured to receive in electrical connection therewith a circuit interrupter having a current carrying rating no greater than the current rating and being structured to resist electrical connection therewith of a circuit interrupter having a current carrying rating greater than the current rating, the electrical enclosure comprising:

an electrical delivery apparatus having a current rating and a number of rejection features; and at least a first rejection feature of the number of rejection features comprising a physical feature that is structured to permit a circuit interrupter having a current carrying rating no greater than the current rating to be electrically connected with and to be mounted on the electrical enclosure while also being structured to resist a circuit interrupter having a current carrying rating greater than the current rating from being at least one of electrically connected with and mounted on the electrical enclosure.

11. The electrical enclosure of claim 10 wherein the at least first rejection feature comprises one or more of:

an elongated conductor having a dimension, the dimension being structured to enable the conductor to be received in a receptacle of and to permit electrical connection with a circuit interrupter having a current carrying rating no greater than the current rating, the dimension being structured to resist at least one of:

reception of the conductor in a receptacle of a circuit interrupter having a current carrying rating greater than the current rating, and attachment of the conductor into electrical connection with a circuit interrupter having a current carrying rating greater than the current rating;

an elongated pair of conductors that are spaced apart a distance, the distance being structured to enable the pair of conductors to be receivable in a pair of receptacles of a circuit interrupter having a current carrying rating equal to or less than the current rating, the distance being structured to resist reception of the pair of conductors in a pair of receptacles of a circuit interrupter having a current carrying rating greater than the current rating; and an interference element that is structured to be engageable with and to thereby resist a circuit interrupter having a current carrying rating greater than the current rating from being electrically connected with the electrical enclosure, the interference element being structured to permit a circuit interrupter having a current carrying rating no greater than the current rating to be received in electrical connection with the electrical enclosure.

12. The electrical enclosure of claim 11 wherein the dimension is one of:

a diameter of the conductor that is structured to be greater than a diameter of the receptacle of the circuit interrupter having the current carrying rating greater than the current rating; and a length of the conductor that is equal to or less than a depth of the receptacle of the circuit interrupter having the current carrying rating greater than the current rating within which the conductor is structured to be received.

13. The electrical enclosure of claim 11 wherein the dimension is a transverse dimension of the conductor and is of a size that is structured to be:

equal to or smaller than a transverse dimension of the receptacle of the current interrupter having the current carrying rating no greater than the current rating; and larger than a transverse dimension of the receptacle of the current interrupter having the current carrying rating greater than the current rating.

14. The electrical enclosure of claim 11 wherein the electrical interruption apparatus is structured to include a pair of electrical terminals having as the pair of receptacles a pair of holes formed in the pair of electrical terminals, and wherein the distance is a spacing between the pair of conductors and is of a size that is structured to:

correspond with a spacing between the pair of holes of the electrical interruption apparatus having the current rating at most equal to the current rating; and conflict with a spacing between the pair of holes of the electrical interruption apparatus having the current carrying rating greater than the current rating.

15. The electrical enclosure of claim 14 wherein the distance is of a size that is structured to be:

equal to the spacing between the pair of holes of the electrical interruption apparatus having the current carrying rating at most equal to the current rating; and different than the spacing between the pair of holes of the electrical interruption apparatus having the current carrying rating greater than the current rating.

16. The electrical enclosure of claim 11 wherein the interference element is a lug on the electrical enclosure, and wherein the electrical interruption apparatus having the current carrying rating no greater than the current rating is structured to include a housing having a void region at the exterior of the housing, the lug being receivable in the void region.

17. The electrical enclosure of claim 16 wherein the lug is structured to be received in and to be engaged with the housing at the void region.

18. The electrical enclosure of claim 10 wherein the physical feature is a physical dimension that is structured to permit the circuit interrupter having the current carrying rating no greater than the current rating to be electrically connected with and to be mounted on the electrical enclosure while also being structured to resist the circuit interrupter having the current carrying rating greater than the current rating from being at least one of electrically connected with and mounted on the electrical enclosure.

* * * * *